Patented Sept. 11, 1951

2,567,433

UNITED STATES PATENT OFFICE 2,567,433

WATER-IN-OIL TYPE EMULSIONS

Gustaf Bristol Heijmer, Stockholm, Sweden

No Drawing. Application February 28, 1948, Serial No. 12,149. In Sweden December 6, 1945

6 Claims. (Cl. 260—21)

This invention relates to stable emulsions of the water-in-oil type and, more particularly, to such emulsions useful as binding agents for varnishes and lacquers.

Heretofore, it has been known that fatty oils, both of the drying and non-drying variety, for example, linseed oil, soybean oil, wood oil, castor oil and the like could be used for producing emulsions of the oil-in-water type. These oils, when agitated with water, for example, produce unstable emulsions of the oil-in-water type. In order to obtain stable oil-in-water emulsions, emulsifying agents must be added, for example, salts of sulfonic acids of polyalkylated aromatic hydrocarbons such as di-isopropyl naphthalene sulfonic acid or dibutyl naphthalene sulfonic acid; salts of raw oil sulfonic acids or sulfonated fatty acids; products obtained by the action of ethylene oxide on hydroxyl derivatives of compounds having long aliphatic chains, such as, castor oil; salts of ammonia or volatile bases with carboxylic acids of high molecular weight, such as wax acids or resin acids; casein in the form of ammonical casein solutions and water soluble methyl or ethyl cellulose or cellulose glycolate. The emulsions obtained with the above mentioned emulsifying agents are of the oil-in-water type.

However, for various purposes it has been desirable to produce emulsions of the water-in-oil type from fatty oils.

Accordingly, it is a primary object of the present invention to provide fatty oil emulsions of the water-in-oil type. Research has indicated that if a water soluble, thermosetting resin, for example a melamine-formaldehyde or urea formaldehyde resin, is added in aqueous solution to a fatty oil acid and the mixture emulsified by any suitable conventional method, a stable and highly useful emulsion of the water-in-oil type can be obtained.

The nature of the present invention will be readily understood in the light of the following examples given merely by way of illustration.

Example 1

500 parts by weight of heat bodied linseed oil, 25 to 250 parts of urea formaldehyde resin (60% aqueous solution) and 10–100 parts of water were mixed together gradually and with agitation and the mixture thereafter homogenized using any suitable conventional apparatus. Pigments can be readily added to the emulsion thus obtained.

The addition of pigments can also be carried out according to the following example:

Example 2

50 parts by weight of linseed oil, 50 to 150 parts lithopone and 5 to 50 parts of urea formaldehyde resin (60% aqueous solution) are mixed with 5 to 50 parts of water, after which the color mixture is homogenized by grinding on a color mill or in any other suitable, well-known manner. The mixture can also be made by first grinding together the linseed oil and pigment and then adding the urea formaldehyde resin or other suitable thermosetting resin in the above described manner.

Since certain modifications may be made in the stable emulsions of the present invention and in the method of producing said emulsions without departing from the scope of the invention, it is intended that all matter contained in the foregoing specification be interpreted merely as illustrative and not in a limiting sense.

The emulsions of the present invention may be produced more cheaply and handled with considerably greater ease than conventional binders and colors which employ relatively large amounts of solvents. The absence of solvents in addition to facilitating the handling of the emulsions in plant operations greatly conserves storage space. Further, the use of the emulsions of the present invention produces a protective coating on the surface being treated having enhanced durability, resistance to water and resistance to ageing due to the presence in the emulsion of the thermosetting resin.

What is claimed is:

1. A stable emulsion of the water-in-oil type suitable for use as a lacquer and varnish binding agent, said emulsion comprising water as the dispersed phase, a drying oil as the dispersion medium and a water-soluble thermosetting resin as the emulsifying agent, said resin being selected from the group consisting of urea-formaldehyde and melamine-formaldehyde resins.

2. A stable emulsion of the water-in-oil type suitable for use as a lacquer and varnish binding agent, said emulsion comprising water as the dispersed phase, a drying oil as the dispersion medium, a water-soluble thermosetting resin as the emulsifying agent and a pigment, said resin being selected from the group consisting of urea-formaldehyde and melamine - formaldehyde resins.

3. A stable emulsion of the water-in-oil type suitable for use as a lacquer and varnish binding agent, said emulsion comprising water as the dispersed phase, a drying oil as the dispersion medium and a water-soluble urea formaldehyde resin as the emulsifying agent.

4. A stable emulsion of the water-in-oil type suitable for use as a lacquer and varnish binding agent, said emulsion comprising water as the dispersed phase, a drying oil as the dispersion medium and a water-soluble melamine-formaldehyde resin as the emulsifying agent.

5. A stable emulsion of the water-in-oil type suitable for use as a lacquer and varnish binding agent, said emulsion comprising water as the dispersed phase, linseed oil as the dispersion medium and a water-soluble urea formaldehyde resin as the emulsifying agent.

6. A stable emulsion of the water-in-oil type suitable for use as a lacquer and varnish binding agent, said emulsion comprising water as the dispersed phase, linseed oil as the dispersion medium and a water-soluble melamine formaldehyde resin as the emulsifying agent.

GUSTAF BRISTOL HEIJMER.

REFERENCES CITED

The following references are of record in the file of this patent:

UNITED STATES PATENTS

| Number | Name | Date |
| --- | --- | --- |
| 2,296,427 | Daniel et al. | Sept. 22, 1942 |
| 2,401,666 | Schmidt | Jan. 4, 1946 |